United States Patent
Zhang et al.

(10) Patent No.: US 9,582,710 B2
(45) Date of Patent: Feb. 28, 2017

(54) METHOD AND APPARATUS FOR GENERATING STRONG CLASSIFIER FOR FACE DETECTION

(71) Applicant: Huawei Technologies Co., Ltd., Shenzhen (CN)

(72) Inventors: Yu Zhang, Shenzhen (CN); Zhijun Du, Shenzhen (CN); Minjie Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 316 days.

(21) Appl. No.: 14/558,414

(22) Filed: Dec. 2, 2014

(65) Prior Publication Data

US 2015/0154441 A1    Jun. 4, 2015

(30) Foreign Application Priority Data

Dec. 2, 2013    (CN) .......................... 2013 1 0634252

(51) Int. Cl.
  *G06K 9/00*    (2006.01)
  *G06K 9/62*    (2006.01)
  *G06K 9/46*    (2006.01)

(52) U.S. Cl.
  CPC ..... *G06K 9/00295* (2013.01); *G06K 9/00221* (2013.01); *G06K 9/4614* (2013.01);
  (Continued)

(58) Field of Classification Search
  CPC .... G06K 9/626; G06K 9/6217; G06K 9/6256; G06K 9/6262; G06K 9/6257; G06K 9/00248; G06K 9/00268
  See application file for complete search history.

(56) References Cited

U.S. PATENT DOCUMENTS

| | | | | |
|---|---|---|---|---|
| 7,835,549 | B2 * | 11/2010 | Kitamura | G06K 9/00248 382/118 |
| 2003/0200188 | A1 * | 10/2003 | Moghaddam | G06K 9/6256 706/25 |

(Continued)

OTHER PUBLICATIONS

Liao et al., "Learning Multi-scale Block Local Binary Patterns for Face Recognition," Proceedings from International Conference on Advances in Biometrics, pp. 828-837, Springer-Verlag, Berlin, Germany (2007).

(Continued)

*Primary Examiner* — Wesley Tucker
(74) *Attorney, Agent, or Firm* — Leydig, Voit & Mayer, Ltd.

(57) ABSTRACT

Embodiments of the present invention disclose methods for generating a strong classifier for face detection. The methods include determining, according to a size of a prestored image training sample, a parameter of weak classifier of the image training sample, obtaining a sketch value of each of the weak classifiers of the image training sample, calculating a weighted classification error of each of the weak classifiers according to the sketch value and an initial weight of the image training sample, obtaining at least one optimal weak classifier according to the weighted classification error, and generating a strong classifier for face detection according to the optimal weak classifiers. The embodiments of the present invention further disclose an apparatus for generating a strong classifier for face detection. The embodiments of the present invention have advantages of improving robustness of code against noise and reducing a false detection rate of face detection.

14 Claims, 4 Drawing Sheets

(52) U.S. Cl.
CPC ......... *G06K 9/6256* (2013.01); *G06K 9/6257* (2013.01); *G06K 2009/4666* (2013.01)

(56) References Cited

U.S. PATENT DOCUMENTS

| | | | | |
|---|---|---|---|---|
| 2005/0147303 | A1* | 7/2005 | Zhou | G06K 9/6206 382/190 |
| 2005/0213810 | A1* | 9/2005 | Sabe | G06K 9/00248 382/159 |
| 2005/0220336 | A1* | 10/2005 | Sabe | G06K 9/00248 382/159 |
| 2009/0287620 | A1* | 11/2009 | Xu | G06K 9/00248 706/12 |
| 2009/0324060 | A1* | 12/2009 | Sato | G06K 9/00228 382/159 |

OTHER PUBLICATIONS

Nguyen et al., "Object Detection Using Non-Redundant Local Binary Patterns," Proceedings of 2010 IEEE 17$^{th}$ International Conference on Image Processing, Institute of Electrical and Electronics Engineers, New York, New York (Sep. 26-29, 2010).

Viola et al., "Rapid Object Detection using a Boosted Cascade of Simple Features," Proceedings of 2001 IEEE Computer Society Conference on Computer Vision and Pattern Recognition, vol. 1, Institute of Electrical and Electronics Engineers, New York, New York (2001).

Zhang et al., "Face Detection Based on Multi-Block LBP Representation," Advances in Biometrics, Lecture Notes in Computer Science, vol. 4642, pp. 11-18, Springer-Verlag, Berlin, Germany (2007).

Meng et al., "Face Recognition Based on Local Binary Patterns with Threshold," 2010 IEEE International Conference on Granular Coumputing, Institute of Electrical and Electronics Engineers, New York, New York (2010).

* cited by examiner

METHOD AND APPARATUS FOR GENERATING STRONG CLASSIFIER FOR FACE DETECTION

CROSS-REFERENCE TO RELATED APPLICATIONS

This application claims priority to Chinese Patent Application No. 201310634252.5, filed on Dec. 2, 2013, which is incorporated herein by reference in its entirety.

TECHNICAL FIELD

The present invention relates to the field of electronic technologies, and in particular, to a method and an apparatus for generating a strong classifier for face detection.

BACKGROUND

A face detection technology refers to a process of determining whether there is a human face in a given image and identifying a location and a range of the human face. Correct face detection can effectively improve face recognition efficiency and speed.

In prior art 1, face detection is mainly performed by using a Haar feature and an Adaboost algorithm. The Haar feature is used to indicate a human face; the Adaboost algorithm is used to select a rectangular frame (weak classifier) of any size and at any location; and the weak classifier is used to form a strong classifier to perform face detection and recognition on an image. The number of Haar features is relatively large in a face detection method of prior art 1; and the Haar features are simple. Therefore, a large number of weak classifiers are required in a sample training process of an image, a feature training process of the image is slow, and training takes a long time.

In prior art 2, face detection is mainly performed by using an Mblbp feature and the Adaboost algorithm. A corresponding weak classifier is selected by calculating an average grayscale value of a specified area of an image sample and calculating a weighted error of classification performed by the weak classifier on the image sample; and the weak classifier is used to form a strong classifier to perform face detection and recognition on an image. Parameters corresponding to a weak classifier in a face detection method of prior art 2 only include a location and a size of a rectangular frame; and a threshold is not included. When an average grayscale value of a training sample is calculated, a comparison value is fixed to 0, which causes poor robustness of the Mblbp feature against noise, a high false detection rate of face detection, and a poor user experience effect of face detection.

SUMMARY

Embodiments of the present invention provide a method and an apparatus for generating a strong classifier for face detection, which can improve a training speed of an image training sample, improve robustness of code against noise, and reduce a false detection rate of face detection.

According to a first aspect, an embodiment of the present invention provides a method for generating a strong classifier for face detection, and the method may include:

determining, according to a size of a prestored image training sample, a parameter of at least one weak classifier of the image training sample;

obtaining a sketch value of each of the weak classifiers of the image training sample according to a preset threshold of a weak classifier and the parameter of each of the weak classifiers;

calculating a weighted classification error of each of the weak classifiers according to the sketch value and an initial weight of the image training sample, and obtaining at least one optimal weak classifier according to the weighted classification error, where the optimal weak classifier is a weak classifier that has a smallest weighted classification error among all the weak classifiers; and generating a strong classifier for face detection according to the optimal weak classifiers.

With reference to the first aspect, in a first possible implementation manner, before the obtaining a sketch value of each of the weak classifiers of the image training sample according to a preset threshold of a weak classifier and the parameter of each of the weak classifiers, the method further includes:

setting the initial number of optimal weak classifiers;

before the generating a strong classifier for face detection according to the optimal weak classifiers, the method further includes:

determining the total number of optimal weak classifiers according to the number of selected optimal weak classifiers and the initial number of optimal weak classifiers;

if the total number of optimal weak classifiers is less than a preset number, updating a weight of the image training sample to obtain an updated weight of the image training sample, calculating a weighted classification error of each of the weak classifiers according to the sketch value and the updated weight of the image training sample to obtain at least one optimal weak classifier with an updated weight, updating the total number of optimal weak classifiers according to the number of optimal weak classifiers with updated weights, and repeating this step until the total number of optimal weak classifiers is not less than the preset number; and if the total number of optimal weak classifiers is not less than the preset number, continuing to perform subsequent steps.

With reference to the first aspect or the first possible implementation manner of the first aspect, in a second possible implementation manner, the parameter includes a location and a size of a rectangular frame of a weak classifier, and the obtaining a sketch value of each of the weak classifiers of the image training sample according to a preset threshold of a weak classifier and the parameter of each of the weak classifiers includes:

for one weak classifier in all the weak classifiers, dividing an area, which uses the location of the rectangular frame of the weak classifier as a center and has a same size as the rectangular frame, into at least two areas, and calculating an average grayscale value of each of the areas;

selecting a reference area from all the areas, and setting a sign bit of each of the areas except the reference area, where the sign bit includes a first sign bit and a second sign bit;

obtaining a sketch value of the weak classifier according to the average grayscale values of the areas, except the reference area, in all the areas, the sign bit, and the preset threshold of a weak classifier; and repeating the foregoing steps until the sketch value of each of the weak classifiers in all the weak classifiers is obtained.

With reference to the second possible implementation manner of the first aspect, in a third possible implementation manner, the obtaining a sketch value of the weak classifier according to the average grayscale values of the areas, except the reference area, in all the areas, the sign bit, and the preset threshold of a weak classifier includes:

comparing the average grayscale value of each of the areas except the reference area with the average grayscale value of the reference area;

if the sign bit of the area is the first sign bit, marking a location of the area as a first location mark if a difference between the average grayscale value of the area and the average grayscale value of the reference area is not less than the threshold, and marking the location of the area as a second location mark if the difference between the average grayscale value of the area and the average grayscale value of the reference area is less than the threshold;

if the sign bit of the area is the second sign bit, marking the location of the area as the first location mark if an opposite number of the difference between the average grayscale value of the area and the average grayscale value of the reference area is not less than the threshold, and marking the location of the area as the second location mark if the opposite number of the difference between the average grayscale value of the area and the average grayscale value of the reference area is less than the threshold; and sorting location marks of all the areas according to a preset order to obtain a sequence, and obtaining the sketch value of the weak classifier according to the sequence.

With reference to any one of the first aspect to the third possible implementation manner of the first aspect, in a fourth possible implementation manner, the calculating a weighted classification error of each of the weak classifiers according to the sketch value and an initial weight of the image training sample includes:

calculating, according to the sketch value of the weak classifier and a feature identifier of each image training sample, a classification error of classification on performed by the weak classifier each image training sample, where the feature identifier of the image training sample is a preset input vector corresponding to a human face feature of the image training sample or a preset input vector corresponding to a non-human face feature of the image training sample; and performing weighted accumulation, according to an initial weight of each image training sample, on the classification error of classification performed by the weak classifier on each image training sample, so as to obtain a weighted classification error of the weak classifier.

With reference to any one of the first possible implementation manner of the first aspect to the fourth possible implementation manner of the first aspect, in a fifth possible implementation manner, the updating a weight of the image training sample to obtain an updated weight of the image training sample includes:

performing face detection on the image training sample according to the optimal weak classifier, and classifying the image training sample according to a detected feature, where the feature includes a human face feature or a non-human face feature;

if a classification result of the image training sample corresponds to a feature of the image training sample, reducing the weight of the image training sample to obtain the updated weight of the image training sample; and if the classification result of the image training sample does not correspond to the feature of the image training sample, increasing the weight of the image training sample to obtain the updated weight of the image training sample.

According to a second aspect, an embodiment of the present invention provides an apparatus for generating a strong classifier for face detection, and the apparatus may include:

a determining module, configured to determine, according to a size of a prestored image training sample, a parameter of at least one weak classifier of the image training sample;

a processing module, configured to obtain a sketch value of each of the weak classifiers of the image training sample according to a preset threshold of a weak classifier and the parameter, which is determined by the determining module, of each of the weak classifiers;

a selecting module, configured to calculate a weighted classification error of each of the weak classifiers according to the sketch value obtained by the processing module and an initial weight of the image training sample, and obtain at least one optimal weak classifier according to the weighted classification error, where the optimal weak classifier is a weak classifier that has a smallest weighted classification error among all the weak classifiers; and a generating module, configured to generate a strong classifier for face detection according to the optimal weak classifiers selected by the selecting module.

With reference to the second aspect, in a first possible implementation manner, the apparatus further includes:

a setting module, configured to set the initial number of optimal weak classifiers;

a judging module, configured to determine whether the total number of optimal weak classifiers is less than a preset number;

a second updating module, configured to determine the total number of optimal weak classifiers according to the number of optimal weak classifiers that are selected by the selecting module and the initial number of optimal weak classifiers that is set by the setting module; and a first updating module, configured to, when a determining result of the judging module is that the total number of optimal weak classifiers is less than the preset number, update a weight of the image training sample to obtain an updated weight of the image training sample; where:

the selecting module is configured to calculate a weighted classification error of each of the weak classifiers according to the sketch value obtained by the processing module and the updated weight of the image training sample obtained by the first updating module to obtain at least one optimal weak classifier with an updated weight;

the second updating module is configured to update the total number of optimal weak classifiers according to the number of optimal weak classifiers that are obtained by the selecting module; and the generating module is configured to, when the determining result of the judging module is that the total number of optimal weak classifiers is not less than the preset number, generate the strong classifier for face detection according to the optimal weak classifiers selected by the selecting module.

With reference to the second aspect or the first possible implementation manner of the second aspect, in a second possible implementation manner, the parameter determined by the determining module includes a location and a size of a rectangular frame of a weak classifier, and the processing module includes:

an average grayscale value determining unit, configured to divide an area, which uses the location of the rectangular frame of the weak classifier as a center and has a same size as the rectangular frame, into at least two areas, and calculate an average grayscale value of each of the areas;

a setting unit, configured to select a reference area from all the areas, and set a sign bit of each of the areas except the reference area, where the sign bit includes a first sign bit and a second sign bit; and a sketch value determining unit, configured to obtain a sketch value of the weak classifier according to the average grayscale values of the areas, except the reference area, in all the areas that is determined by the average grayscale value determining unit, the sign bit set by the setting unit, and the preset threshold of a weak classifier.

With reference to the second possible implementation manner of the second aspect, in a third possible implementation manner, the sketch value determining unit includes:

a comparison subunit, configured to compare the average grayscale value of each of the areas except the reference area with the average grayscale value of the reference area;

a first marking subunit, configured to, when the sign bit of the area is the first sign bit, mark a location of the area as a first location mark if a comparison result of the comparison subunit is that a difference between the average grayscale value of the area and the average grayscale value of the reference area is not less than the preset threshold of a weak classifier, and mark the location of the area as a second location mark if the comparison result of the comparison subunit is that the difference between the average grayscale value of the area and the average grayscale value of the reference area is less than the preset threshold of a weak classifier;

a second marking subunit, configured to, when the sign bit of the area is the second sign bit, mark the location of the area as the first location mark if the comparison result of the comparison subunit is that an opposite number of the difference between the average grayscale value of the area and the average grayscale value of the reference area is not less than the preset threshold of a weak classifier, and mark the location of the area as the second location mark if the comparison result of the comparison subunit is that the opposite number of the difference between the average grayscale value of the area and the average grayscale value of the reference area is less than the preset threshold of a weak classifier; and a sequence value determining subunit, configured to sort location marks of the areas according to a preset order to obtain a sequence, and obtain the sketch value of the weak classifier according to the sequence.

With reference to any one of the second aspect to the third possible implementation manner of the second aspect, in a fourth possible implementation manner, the selecting module is specifically configured to:

calculate, according to the sketch value of the weak classifier and a feature identifier of each image training sample, a classification error of classification performed by the weak classifier on each image training sample, where the feature identifier of the image training sample is a preset input vector corresponding to a human face feature of the image training sample or a preset input vector corresponding to a non-human face feature of the image training sample; and perform weighted accumulation, according to an initial weight of each image training sample, on the classification error of classification performed by the weak classifier on each image training sample, so as to obtain a weighted classification error of the weak classifier.

With reference to any one of the first possible implementation manner of the second aspect to the fourth possible implementation manner of the second aspect, in a fifth possible implementation manner, the first updating module is specifically configured to:

perform face detection on the image training sample according to the optimal weak classifier, and classify the image training sample according to a detected feature, where the feature includes a human face feature or a non-human face feature;

if a classification result of the image training sample corresponds to a feature of the image training sample, reduce the weight of the image training sample to obtain the updated weight of the image training sample; and if the classification result of the image training sample does not correspond to the feature of the image training sample, increase the weight of the image training sample to obtain the updated weight of the image training sample.

In embodiments of the present invention, a parameter of a weak classifier may be determined according to a size of an image training sample, and a sketch value and a weighted classification error of the weak classifier are calculated according to a preset threshold of a weak classifier and a preset weight of the image training sample, so as to select an optimal weak classifier from all weak classifiers and generate a strong classifier according to all weak classifiers. In the embodiments, the parameter of the weak classifier is determined according to the size of the image training sample, which can improve a training speed of the image training sample and reduce, by presetting a threshold of the weak classifier and a weight of the image training sample, a sensitivity of code against noise in a process of calculating a sketch value of the image training sample, thereby reducing a false detection rate of face detection of the strong classifier and improving accuracy of face detection.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
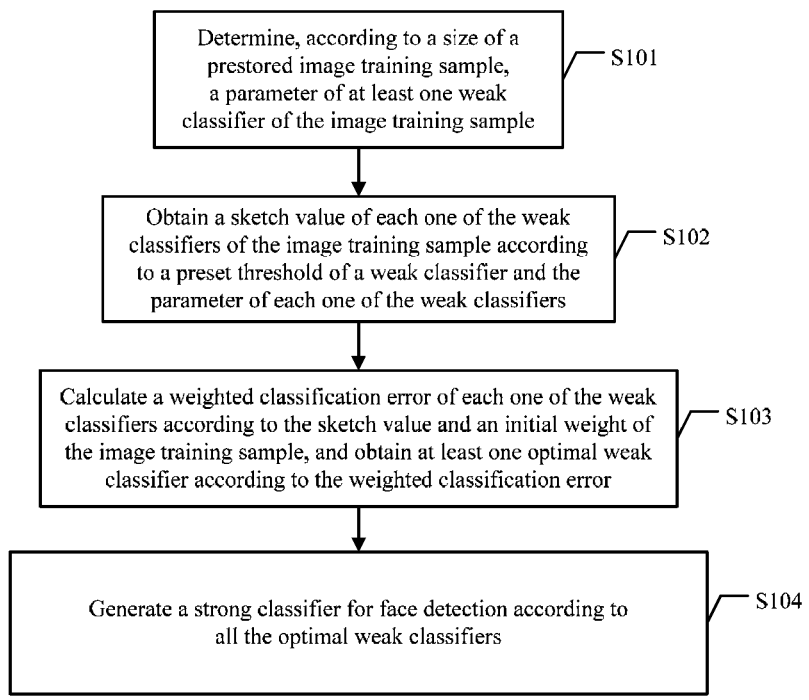
FIG. 1 is a schematic flowchart of an embodiment of a method for generating a strong classifier for face detection according to an embodiment of the present invention.

Refer to FIG. 1, which is a schematic flowchart of an embodiment of a method for generating a strong classifier for face detection according to an embodiment of the present invention. The method for generating a strong classifier for face detection described in this embodiment includes the following steps:

S101. Determine, according to a size of a prestored image training sample, a parameter of at least one weak classifier of the image training sample.

In some feasible implementation manners, a face detection method described in this embodiment of the present invention may include two processes: image sample training and detection. A training process is mainly a process of searching, by training an image sample, for a proper weak classifier to generate a strong classifier, that is, a process of generating the strong classifier for face detection described in this embodiment of the present invention. After the strong classifier is generated, the strong classifier may further be used to form a face detection classifier. A detection process is mainly a process of performing face detection and recognition on an image by using the strong classifier or the face detection classifier obtained by learning in the training process, so as to distinguish between a human face and a non-human face in the image. In specific implementation, face detection may be performed by a strong classifier that is generated according to the method for generating a strong classifier for face detection described in this embodiment and may also be jointly performed by multiple strong classifiers, that is, after the strong classifier is generated, multiple strong classifiers may further be cascaded to generate a face detection classifier. In a process of selecting a weak classifier in the method for generating a strong classifier for face detection described in this embodiment, a sketch value of a weak classifier of an image training sample may be calculated with reference to a preset threshold of a weak classifier, which can improve robustness of code against noise and reduce a classification error of classification performed by the strong classifier on the image training sample, thereby reducing a false detection rate of face detection.

In some feasible implementation manners, in the training process of face detection, a training parameter of an image training sample may be predefined first, that is, the training parameter of the image training sample may be initialized, where the foregoing training parameter of the image training sample may include the number of cascades of weak classifiers (also referred to as the maximum number of cascades of weak classifiers), the number of weak classifiers in each cascade, and the like. In specific implementation, after the training parameter of the image training sample is initialized, all possible weak classifiers may be enumerated according to a size of the image training sample; the number of weak classifiers that generate a strong classifier in each cascade may be determined according to the foregoing defined number of weak classifiers in each cascade; and the strong classifiers generated in each cascade may further be combined, according to the foregoing defined number of cascades of weak classifiers, into a face detection classifier that has the foregoing number of cascades. In some feasible implementation manners, before the training process of face detection is started, an image training sample may be preselected and the foregoing image training sample may be stored at a specified location, where the image training sample may include a positive sample and a negative sample. The positive sample may be an image sample that includes a human face feature, and the negative sample may be an image sample that does not include a human face feature. Specifically, the foregoing image training sample may include multiple positive samples and multiple negative samples. The specific number of image training samples may be determined according to a specific requirement of sample training. Details are not described herein again. In specific implementation, after an image training sample is preselected, the selected image training sample may further be scaled to a specified size according to the specific requirement of sample training. For example, an image sample (positive sample) that includes a human face feature may be dug out from an image that includes a human face and another object, the image sample is scaled to a 24*24 image training sample, and then the image training sample may be stored at a specified location for backup. In addition, an image that has no human face feature may also be directly scaled to a 24*24 image training sample (negative sample), and then the image training sample may be stored at a specified location.

Figure 2:
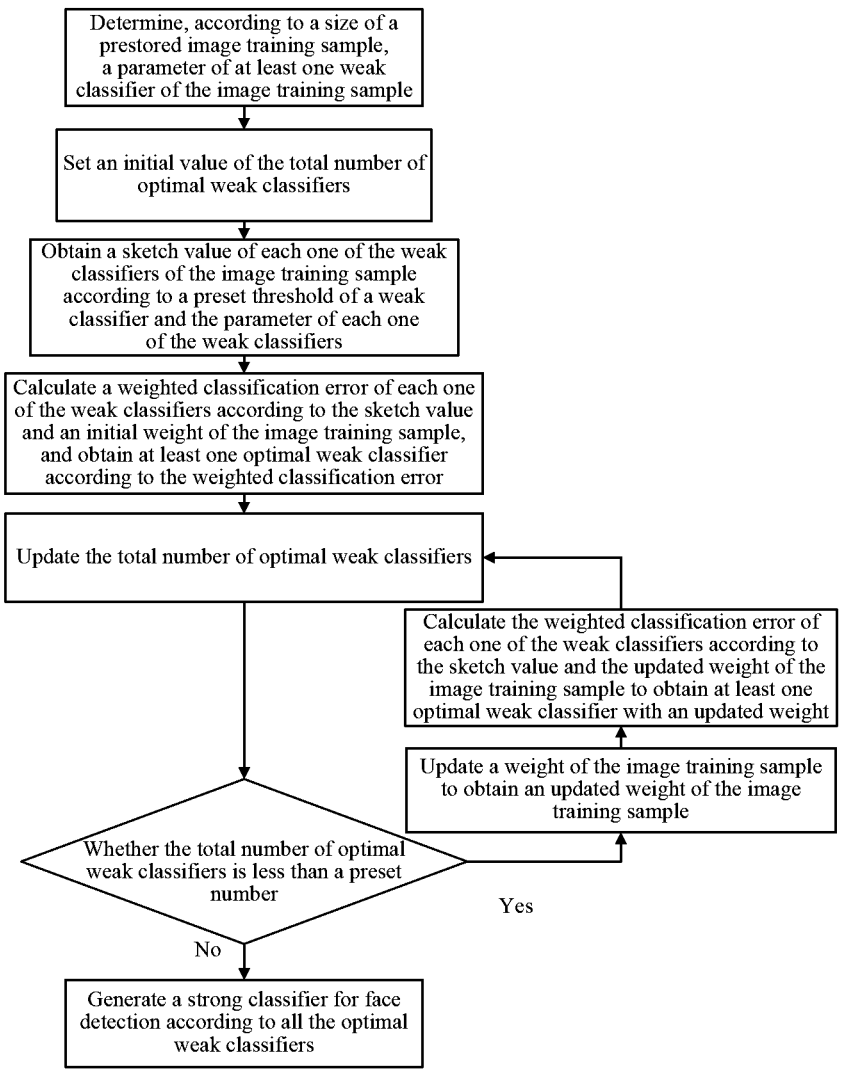
FIG. 2 is another schematic flowchart of an embodiment of a method for generating a strong classifier for face detection according to an embodiment of the present invention.

In some feasible implementation manners, after a backup image training sample is selected, according to the size of a prestored image training sample, all features (that is, all weak classifiers) in that size may be enumerated, and a parameter of a weak classifier of the image training sample is determined (refer to FIG. 2), where the foregoing parameter of the weak classifier may include a location, a size, and the like of a rectangular frame. Specifically, all weak classifiers enumerated according to the foregoing size of the image training sample may be formed by rectangular features that can represent human faces. The rectangular features may include the location, the size, a sign bit, a threshold, and the like of the rectangular frame. Specifically, the foregoing sign bit of the rectangular frame includes 1 or −1; the foregoing threshold may be customized in advance according to an actual requirement of face detection; the foregoing sign bit and the foregoing threshold of the rectangular frame may be specifically used to calculate a sketch value of an image training sample corresponding to weak classifiers in each cascade, which can improve robustness of the face detection classifier against noise and reduce the false detection rate. For example, if the image training sample is an image in a size of 24*24, in this size, a size of a weak classifier may be 3*3, 3*6, 6*9, 24*24, or the like, that is, in this size, the size of a weak classifier may be (a multiple of three)*(a multiple of three), and may be up to 24*24. Specifically, if the foregoing size of a weak classifier is 3*3, the image training sample may be traversed to determine the number of 3*3 rectangular frames that may be arranged in a 24*24 sample image, that is, the number of weak classifiers that the image training sample may have in a 3*3 weak classifier size. In addition, the image training sample may further be traversed to determine the number of rectangular frames, in the 24*24 sample image, corresponding to each possible size of a weak classifier, that is, the number of all weak classifiers in the 24*24 sample image. In this way, all weak classifiers in each cascade may be enumerated (the total number of weak classifiers may be set to m), so as to train all the foregoing weak classifiers and select a proper weak classifier from all the foregoing weak classifiers.

S102. Obtain a sketch value of each of the weak classifiers of the image training sample according to a preset threshold of a weak classifier and the parameter of each of the weak classifiers.

In some feasible implementation manners, when all the foregoing weak classifiers are trained, a sketch value of each weak classifier of each image training sample may be calculated according to the foregoing preset threshold of a weak classifier and the parameter of the weak classifier. In specific implementation, when a sketch value of any weak classifier in all the foregoing weak classifiers, that is, a sketch value, in each image training sample, of any weak classifier (for example, a weak classifier 1) is calculated, a sketch value, in any image training sample (for example, an image training sample A), of the foregoing weak classifier 1 may be calculated first. Specifically, an area in the image training sample A, which uses the weak classifier 1 as a center and has a same size as a rectangular frame of the weak classifier 1, may be divided into multiple areas (for example, 3*3 areas); and an average grayscale value of each of the areas is calculated. Table 1 is used as an example.

TABLE 1

| 7 | 8 | 12 |
|---|---|----|
| 8 | 9 | 11 |
| 6 | 20 | 19 |

Numbers in the foregoing table 1 are average grayscale values of various areas and may be specifically obtained by integral image calculation. After the average grayscale value of each of the foregoing areas is obtained by calculation, an area may further be selected from the foregoing areas as a reference area (for example, a central area in table 1, that is, an area of which the average grayscale value is 9), and a sign bit of each area, except the reference area, in the foregoing areas is set, where the foregoing sign bit includes a first sign bit (for example, 1) and a second sign bit (for example, −1). After the sign bit of each of the foregoing areas is set, a sketch value corresponding to a threshold of the foregoing weak classifier 1 may be calculated according to the average grayscale value and the sign bit of each of the foregoing areas. For example, when the preset threshold of a weak classifier is 2, a sketch value, in the image training sample A, of the foregoing weak classifier 1 may be calculated when the threshold of the weak classifier 1 is 2. Specifically, the average grayscale value of each area except the reference area may be separately compared with the average grayscale value of the reference area. When the sign bit of the foregoing area is the first sign bit, a location of the area may be marked as a first location mark (for example, 1) if a difference between the average grayscale value of the foregoing area and the average grayscale value of the reference area is greater than or equal to 2; otherwise, the location of the area is marked as a second location mark (for example, 0). When the sign bit of the foregoing area is the second sign bit, the location of the area is marked as the first location mark if an opposite number of the difference between the average grayscale value of the foregoing area and the average grayscale value of the reference area is greater than or equal to 2; if the difference between the average grayscale value of the foregoing area and the average grayscale value of the reference area is less than 2, the location of the foregoing area is marked as the second location mark. Table 2 is used as an example.

TABLE 2

| 0 | 0 | 1 |
|---|---|---|
| 0 |   | 1 |
| 0 | 1 | 1 |

As shown in table 2, after the location of each of the foregoing areas is marked, a location identifier of each of the foregoing areas may be sorted according to a preset order (for example, clockwise) to obtain a sequence (00111100); and the foregoing sequence may further be encoded to obtain the sketch value, in the image training sample A, of the weak classifier 1. In specific implementation, as shown in table 2, after the location of each of the foregoing areas is marked according to the average grayscale value of each of the foregoing areas, an 8-bit binary sequence may be obtained. An integer ranging from 0 to 255 may be obtained by encoding the foregoing binary sequence. The foregoing integer, the location and the size of the rectangular frame of the weak classifier 1, and a sign bit and a threshold (the foregoing threshold 2) of each area in the rectangular frame of the weak classifier when the sequence is obtained jointly represent features of the weak classifier 1. In addition, when the sketch value, in the image training sample A, of the weak classifier 1 is calculated, the sketch value, in the foregoing image training sample A, of the foregoing weak classifier 1 may also be calculated when the preset threshold is another value (for example, each of 0 to 255). The foregoing threshold may be set according to an average grayscale value in each area of the weak classifier and includes any one ranging from a smallest value of a difference between average grayscale values and a largest value of the difference between the average grayscale values. In specific implementation, after the sketch value, in the foregoing image training sample A, of the foregoing weak classifier 1 is calculated, a sketch value, in another image training sample, of the foregoing weak classifier 1 may also be calculated, and then a sketch value, in each image training sample, of another weak classifier may be calculated. That is, a sketch value, in each image training sample, of each weak classifier may be calculated according to the foregoing method. The foregoing sketch value may be one of sketch values that are obtained by combining all preset thresholds of weak classifiers with all sign bits of weak classifiers. For example, if there are m weak classifiers, n image training samples (including positive samples and negative samples), two sign bits (including +1 and −1) of the foregoing weak classifiers, 255 preset thresholds of weak classifiers (that is, 255 possibilities), each weak classifier has 255 sketch values corresponding to the first sign bit (+1) and 255 sketch values corresponding to the second sign bit (−1) in each image training sample, 510 sketch values in total; and then it can be learned that each weak classifier has n*510 sketch values in all image training samples. After the sketch values, in all image training samples, of each weak classifier are determined, weighted classification errors of classification on all image training samples performed by each weak classifier may be calculated; and then a weak classifier that causes a smallest weighted classification error to the image training sample may be selected as an optimal weak classifier from all weak classifiers (m weak classifiers) according to the weighted classification errors of classification on the image training samples performed by each weak classifier.

S103. Calculate a weighted classification error of each of the weak classifiers according to the sketch value and an initial weight of the image training sample, and obtain at least one optimal weak classifier according to the weighted classification error.

S104. Generate a strong classifier for face detection according to the optimal weak classifiers.

In some feasible implementation manners, after the sketch value of each weak classifier of all image training samples is obtained by calculation, the weighted classification error of each weak classifier may be calculated according to the foregoing sketch value and the initial weight of the image training sample. In specific implementation, before the weighted classification error of classification performed by the weak classifier on the image training sample is calculated, the initial weight of the image training sample may be preset; after an optimal weak classifier is determined according to a feature of the weak classifier and the initial weight of the image training sample, an updated weight of the image training sample may be obtained by adjusting a weight of the image training sample, and then next one or more optimal weak classifiers are determined according to the sketch value of the weak classifier and the updated weight of the image training sample. For example, after the sketch value, in the foregoing image training sample A, of the foregoing weak classifier 1 is obtained by calculation according to the foregoing method, a classification error of classification performed by the weak classifier 1 on the image training sample A may be calculated according to a feature identifier (for example, 1) of the image training sample A (for example, the classification error of classification performed by the weak classifier 1 on the image training sample A may be indicated by the square of a difference between the feature identifier of the image training sample A and the sketch value, in the image training sample A, of the weak classifier 1); and then a sketch value, in another image training sample, of the weak classifier 1 and a classification error of classification performed by the weak classifier 1 on another image training sample are obtained according to the same processing method. After classification errors of classification on all image training samples performed by the weak classifier 1 are determined, weighted accumulation is performed, according to the initial weight of each image training sample, on the classification error of classification performed by the weak classifier 1 on each image training sample, so as to obtain a weighted classification error of classification performed by the weak classifier 1 on total image training samples (n image training samples). The foregoing feature identifier of the image training sample is a predefined input vector (for example, 1) corresponding to a human face feature of the image training sample or a predefined input vector (for example, 0) corresponding to a non-human face feature (feature of another object) of the image training sample.

In some feasible implementation manners, after weighted classification errors of all the weak classifiers are obtained by calculation, a weak classifier that has a smallest weighted classification error may be selected from all the weak classifiers as an optimal weak classifier. The foregoing optimal weak classifier may be used to form a strong classifier. In specific implementation, before an optimal weak classifier is selected from multiple weak classifiers, the initial number of weak classifiers, for example, 0, may be set. After the weighted classification errors of all the weak classifiers are obtained by calculation and the optimal weak classifier is selected from all the weak classifiers, the number of selected optimal weak classifiers may be accumulated, so as to ensure that the number of selected optimal weak classifiers meets a preset number. One or more optimal weak classifiers may be selected at each round. For example, when there is only one weak classifier that has the smallest weighted classification error among all the weak classifiers, this weak classifier may be selected as the optimal weak classifier, and the total number of optimal weak classifiers increases by one; when there are two weak classifiers that have the smallest weighted classification error among all the weak classifiers, that is, the two weak classifiers have a same weighted classification error, and the weighted classification error is a smallest one among all weighted classification errors, both the two weak classifiers that have the smallest weighted classification error may be selected as optimal weak classifiers, and the total number of optimal weak classifiers increases by 2.

In some feasible implementation manners, after the weak classifier that has the smallest weighted classification error is selected from all the weak classifiers as the optimal weak classifier according to weighted classification errors of classification performed by all the foregoing weak classifiers on the image training samples, face detection may further be performed on each of the foregoing image training samples by using the foregoing optimal weak classifier; each image training sample is classified according to a detected feature; and then whether the detected feature corresponds to a feature of the image training sample is determined according to a classification result. If the detected feature accords with the feature of the image training sample (that is, the classification result of the image training sample corresponds to the feature of the image training sample), the weight of the image training sample may be reduced; if the detected feature does not accord with the feature of the image training sample, the weight of the image training sample may be increased. The foregoing detected feature includes a human face feature or a non-human face feature. For example, if it is detected, by using the foregoing optimal weak classifier, that a feature of the image training sample A is the human face feature, the image training sample may be classified into a category corresponding to the human face feature. If the image training sample A is a positive sample (that is, a sample that includes the human face feature), it can be determined and learned that a classification result of the image training sample A corresponds to the feature of the image training sample A, and then a weight of the image training sample A may be reduced. If it is detected, by using the foregoing image training sample, that the feature of the image training sample A is the non-human face feature, the image training sample A may be classified into a category corresponding to the non-human face feature. However, the image training sample A is a positive sample; therefore, it can be determined and obtained that the classification result of the image training sample does not correspond to the feature of the image training sample A. In this case, the weight of the image training sample A may be increased, so as to strengthen training on the image training sample A. Specifically, after the weight of the image training sample is updated, the foregoing step of calculating the weighted classification error of the weak classifier may be repeated according to a new weight of the image training sample, so that a weighted classification error of classification performed by each weak classifier on the foregoing image training sample with the updated weight may be obtained by calculation; and then the weak classifier that has the smallest weighted classification error may be selected from all the weak classifiers as a new optimal weak classifier according to a new weighted classification error. In specific implementation, after a preset number of optimal weak classifiers are selected according to the foregoing method, a strong classifier, for example, a strong classifier in a first cascade of a face detection classifier, may be generated according to the foregoing preset number of optimal weak classifiers.

In some feasible implementation manners, after a preset number of optimal weak classifiers in any cascade are selected and the preset number of optimal weak classifiers form a strong classifier in the cascade, a prestored image training sample may be replaced; and the foregoing steps may be cyclically performed again to acquire an optimal weak classifier in another cascade among the number of cascades of the foregoing face detection classifier, so as to generate a strong classifier in another cascade. In specific implementation, after the strong classifier is generated according to the foregoing method, face detection may be performed on prestored image training samples by using the strong classifier; and the image training samples are classified according to a detected feature of the image training samples to detect whether a classification effect of the strong classifier meets a desired requirement, so as to determine, according to a detection result, whether to replace the prestored image training samples with a batch of new image training samples for training. For example, an image training sample that includes a new human face feature is added; or an image training sample that includes a new non-human face feature is added; or a new image training sample that includes a non-human face feature is used to replace a specified image training sample in the prestored image training samples; or the like. For example, if a human face feature in an image sample is not very clear, which causes a relatively large weighted classification error of classification performed by a weak classifier on the image training sample in a training process, an image sample in which a human face feature is relatively clear is added to the prestored image training samples, so as to strengthen training on the human face feature. In this way, after the prestored image training samples are replaced with a batch of new image training samples, the foregoing process may be cyclically performed again to generate a strong classifier in a new cascade; afterward, the prestored image training samples are updated after each generation of a strong classifier in a cascade to generate a strong classifier in a new cascade, until the number of generated strong classifiers is not less than a number required by a preset number of cascades. After all strong classifiers in the preset number of cascades are generated according to the foregoing method, all the strong classifiers may be combined into a face detection classifier, so as to perform face detection on an image sample by using the foregoing face detection classifier.

According to a method for generating a strong classifier for face detection described in this embodiment, a size of an image training sample, and a sign bit and a threshold of a weak classifier may be preset; a location and a size of a rectangular frame of the weak classifier may be determined according to the size of the image training sample; when a sketch value of the image training sample is calculated, the sketch value of the image training sample may be calculated according to the preset sign bit and threshold of the weak classifier and with reference to an average grayscale value of each small area in the rectangular frame of the weak classifier; then, a weighted classification error of classification performed by the weak classifier on the image training sample may be calculated according to the sketch value and a weight of the image training sample; an optimal weak classifier is selected from all weak classifiers according to the weighted classification error; a strong classifier is generated according to all selected optimal weak classifiers; and the strong classifier may further be combined into a face detection classifier. When an image training sample is detected by the strong classifier for face detection generated according to the method described in this embodiment, robustness against noise may be improved, accuracy of face detection is increased, and a user experience effect of face detection is enhanced.

Figure 3:
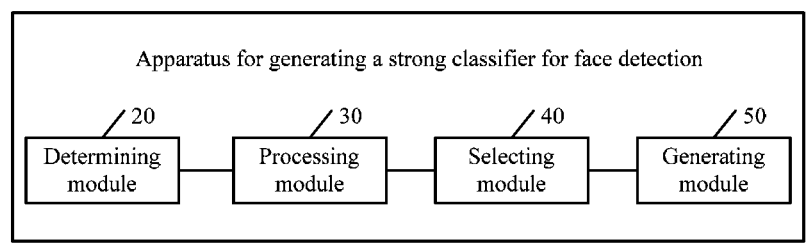
FIG. 3 is a schematic structural diagram of an embodiment of an apparatus for generating a strong classifier for face detection according to an embodiment of the present invention.

Refer to FIG. 3, which is a schematic structural diagram of an embodiment of an apparatus for generating a strong classifier for face detection according to an embodiment of the present invention. The apparatus for generating a strong classifier for face detection described in this embodiment includes:

a determining module 20, configured to determine, according to a size of a prestored image training sample, a parameter of at least one weak classifier of the image training sample;

a processing module 30, configured to obtain a sketch value of each of the weak classifiers of the image training sample according to a preset threshold of a weak classifier and the parameter, which is determined by the determining module, of each of the weak classifiers;

a selecting module 40, configured to calculate a weighted classification error of each of the weak classifiers according to the sketch value obtained by the processing module and an initial weight of the image training sample, and obtain at least one optimal weak classifier according to the weighted classification error, where the optimal weak classifier is a weak classifier that has a smallest weighted classification error among all the weak classifiers; and a generating module 50, configured to generate a strong classifier for face detection according to the optimal weak classifiers selected by the selecting module.

Figure 4:
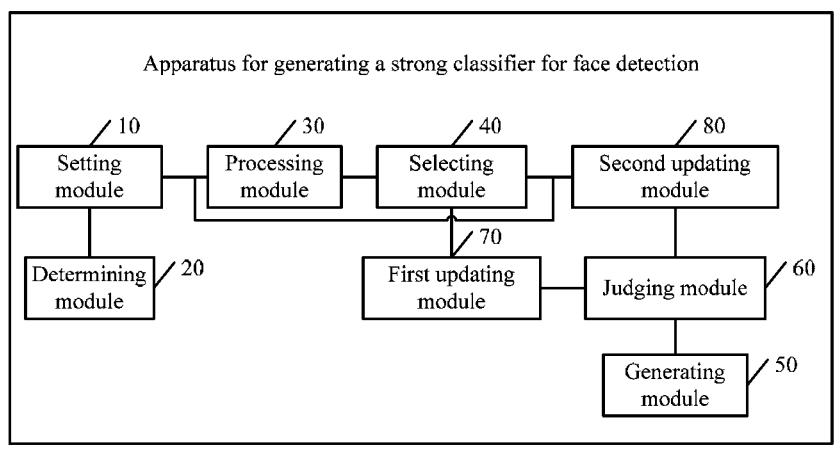
FIG. 4 is another schematic structural diagram of an embodiment of an apparatus for generating a strong classifier for face detection according to an embodiment of the present invention.

In some feasible implementation manners, the apparatus (as shown in FIG. 4) for generating a strong classifier for face detection described in this embodiment further includes:

a setting module 10, configured to set the initial number of optimal weak classifiers;

a judging module 60, configured to determine whether the total number of optimal weak classifiers is less than a preset number;

a second updating module 80, configured to determine the total number of optimal weak classifiers according to the number of optimal weak classifiers that are selected by the selecting module and the initial number of optimal weak classifiers that is set by the setting module; and a first updating module 70, configured to, when a determining result of the judging module is that the total number of optimal weak classifiers is less than the preset number, update a weight of the image training sample to obtain an updated weight of the image training sample; where:

the selecting module 40 is configured to calculate a weighted classification error of each of the weak classifiers according to the sketch value obtained by the processing module and the updated weight of the image training sample obtained by the first updating module to obtain at least one optimal weak classifier with an updated weight;

the second updating module 80 is configured to update the total number of optimal weak classifiers according to the number of optimal weak classifiers that are obtained by the selecting module; and the generating module 50 is configured to, when the determining result of the judging module is that the total number of optimal weak classifiers is not less than the preset number, generate the strong classifier for face detection according to the optimal weak classifiers selected by the selecting module.

Figure 5:
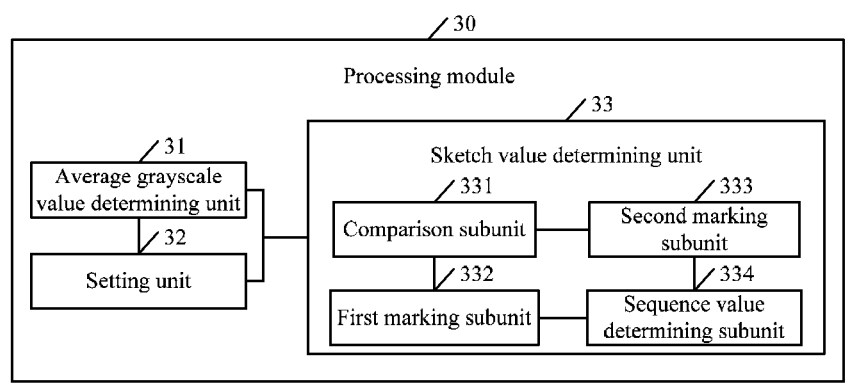
FIG. 5 is a schematic structural diagram of a processing module of a face detection apparatus according to an embodiment of the present invention.

In some feasible implementation manners, the foregoing processing module 30 (as shown in FIG. 5) includes:

an average grayscale value determining unit 31, configured to divide an area, which uses the location of the rectangular frame of the weak classifier as a center and has a same size as the rectangular frame, into at least two areas, and calculate an average grayscale value of each of the areas;

a setting unit 32, configured to select a reference area from all the areas, and set a sign bit of each of the areas except the reference area, where the sign bit includes a first sign bit and a second sign bit; and a sketch value determining unit 33, configured to obtain a sketch value of the weak classifier according to the average grayscale values of the areas, except the reference area, in all the areas that is determined by the average grayscale value determining unit, the sign bit set by the setting unit, and the preset threshold of a weak classifier.

The sketch value determining unit 33 includes:

a comparison subunit 331, configured to compare the average grayscale value of each of the areas except the reference area with the average grayscale value of the reference area;

a first marking subunit 332, configured to, when the sign bit of the area is the first sign bit, mark a location of the area as a first location mark if a comparison result of the comparison subunit is that a difference between the average grayscale value of the area and the average grayscale value of the reference area is not less than the preset threshold of a weak classifier, and mark the location of the area as a second location mark if the comparison result of the comparison subunit is that the difference between the average grayscale value of the area and the average grayscale value of the reference area is less than the preset threshold of a weak classifier;

a second marking subunit 333, configured to, when the sign bit of the area is the second sign bit, mark the location of the area as the first location mark if the comparison result of the comparison subunit is that an opposite number of the difference between the average grayscale value of the area and the average grayscale value of the reference area is not less than the preset threshold of a weak classifier, and mark the location of the area as the second location mark if the comparison result of the comparison subunit is that the opposite number of the difference between the average grayscale value of the area and the average grayscale value of the reference area is less than the preset threshold of a weak classifier; and a sequence value determining subunit 334, configured to sort a location mark of each of the areas according to a preset order to obtain a sequence, and obtain the sketch value of the weak classifier according to the sequence.

In some feasible implementation manners, the foregoing selecting module 40 is specifically configured to: calculate, according to the sketch value of the weak classifier and a feature identifier of each image training sample, a classification error of classification performed by the weak classifier on each image training sample, where the feature identifier of the image training sample is a preset input vector corresponding to a human face feature of the image training sample or a preset input vector corresponding to a non-human face feature of the image training sample; and perform weighted accumulation, according to an initial weight of each image training sample, on the classification error of classification performed by the weak classifier on each image training sample, so as to obtain a weighted classification error of the weak classifier.

In some feasible implementation manners, the foregoing first updating module 70 is specifically configured to:

perform face detection on the image training sample according to the optimal weak classifier, and classify the image training sample according to a detected feature, where the feature includes a human face feature or a non-human face feature;

if a classification result of the image training sample corresponds to a feature of the image training sample, reduce the weight of the image training sample to obtain the updated weight of the image training sample; and if the classification result of the image training sample does not correspond to the feature of the image training sample, increase the weight of the image training sample to obtain the updated weight of the image training sample.

In specific implementation, a face detection method may include two processes: image sample training and detection. A training process is mainly a process of searching, by training an image sample, for a proper weak classifier to generate a strong classifier, that is, a main process of implementing the apparatus for generating a strong classifier for face detection described in this embodiment of the present invention. After the strong classifier is generated by using the apparatus for generating a strong classifier for face detection described in this embodiment, a face detection classifier may further be generated according to the generated strong classifier. A detection process of face detection is mainly a process of performing face detection and recognition on an image by using the strong classifier or the face detection classifier that is generated by using the apparatus described in this embodiment, so as to distinguish between a human face and a non-human face in the image. In specific implementation, face detection may be performed by a single strong classifier that is generated by the apparatus for generating a strong classifier for face detection described in this embodiment and may also be jointly performed by multiple strong classifiers that are generated by the foregoing generating apparatus, that is, after the strong classifier is generated by the foregoing apparatus, multiple strong classifiers may further be cascaded to generate the face detection classifier. In a process of selecting an optimal weak classifier by using the apparatus for generating a strong classifier for face detection described in this embodiment, a sketch value of a weak classifier of an image training sample may be calculated with reference to the preset threshold of a weak classifier, which can improve robustness of code against noise and reduce a classification error of classification performed by the strong classifier on the image training sample, thereby reducing a false detection rate of face detection.

In some feasible implementation manners, in the training process of face detection, a training parameter of an image training sample may be predefined first, that is, the training parameter of the image training sample may be initialized, where the foregoing training parameter of the image training sample may include the number of cascades of weak classifiers (also referred to as the maximum number of cascades of weak classifiers), the number of weak classifiers in each cascade, and the like. In specific implementation, after the training parameter of the image training sample is initialized, all possible weak classifiers may be enumerated according to a size of the image training sample; the number of weak classifiers that generate a strong classifier in each cascade may be determined according to the foregoing defined number of weak classifiers in each cascade; and the strong classifiers generated in each cascade may further be combined, according to the foregoing defined number of cascades of weak classifiers, into a face detection classifier that has the foregoing number of cascades.

In some feasible implementation manners, before the training process of face detection is started, an image training sample may be preselected and the foregoing image training sample may be stored at a specified location, where the image training sample may include a positive sample and a negative sample. The positive sample may be an image sample that includes a human face feature, and the negative sample may be an image sample that does not include a human face feature. Specifically, the foregoing image training sample may include multiple positive samples and multiple negative samples. The specific number of image training samples may be determined according to a specific requirement of sample training. Details are not described herein again. In specific implementation, after an image training sample is preselected, the selected image training sample may further be scaled to a specified size according to the specific requirement of sample training. For example, an image sample (positive sample) that includes a human face feature may be dug out from an image that includes a human face and another object, the image sample is scaled to a 24*24 image training sample, and then the image training sample may be stored at a specified location for backup. In addition, an image that has no human face feature may also be directly scaled to a 24*24 image training sample (negative sample), and then the image training sample may be stored at a specified location.

In some feasible implementation manners, after a backup image training sample is selected, according to the size of a prestored image training sample, all features (that is, all weak classifiers) in that size may be enumerated by using the determining module 20, that is, a parameter of a weak classifier of the image training sample is determined, where the foregoing parameter of the weak classifier may include a location, a size, and the like of a rectangular frame. Specifically, all weak classifiers enumerated by the determining module 20 according to the foregoing size of the image training sample may be formed by rectangular features that can represent human faces. The rectangular features may include the location, the size, a sign bit, a threshold, and the like of the rectangular frame. Specifically, the foregoing sign bit of the rectangular frame includes 1 or −1; the foregoing threshold may be customized in advance according to an actual requirement of face detection; the foregoing sign bit and the foregoing threshold of the rectangular frame may be specifically used to calculate a sketch value of an image training sample corresponding to weak classifiers in each cascade, which can improve robustness of the face detection classifier against noise and reduce the false detection rate. For example, if the image training sample is an image in a size of 24*24, in this size, a size of a weak classifier that is determined by the determining module 20 may be 3*3, 3*6, 6*9, 24*24, or the like, that is, in this size, the size of a weak classifier may be (a multiple of three)*(a multiple of three), and may be up to 24*24. Specifically, if the foregoing size of a weak classifier is 3*3, the determining module 20 may traverse the image training sample to determine the number of 3*3 rectangular frames that may be arranged in a 24*24 sample image, that is, the number of weak classifiers that the image training sample may have in a 3*3 weak classifier size. In addition, the determining module 20 may further traverse the image training sample to determine the number of rectangular frames, in the 24*24 sample image, corresponding to each possible size of a weak classifier, that is, the number of all weak classifiers in the 24*24 sample image. In this way, all weak classifiers in each cascade may be enumerated (the total number of weak classifiers may be set to m), so as to train all the foregoing weak classifiers and select a proper weak classifier from all the foregoing weak classifiers. In specific implementation, for a specific implementation process of determining, by the determining module, the parameter of at least one weak classifier of the image training sample according to the size of a prestored image training sample, reference may be made to step S101 in the embodiment of the method for generating a strong classifier for face detection provided in an embodiment of the present invention. Details are not described herein again.

In some feasible implementation manners, when the generating apparatus described in this embodiment trains all the foregoing weak classifiers, a sketch value of each weak classifier of each image training sample may further be calculated by using the processing module 30 according to the foregoing preset threshold of a weak classifier and the parameter of the weak classifier. In specific implementation, when calculating a sketch value of any weak classifier in all the foregoing weak classifiers, that is, a sketch value, in each image training sample, of any weak classifier (for example, a weak classifier 1), the processing module 30 may first calculate a sketch value, in any image training sample (for example, an image training sample A), of the foregoing weak classifier 1. Specifically, the processing module 30 may divide, by using the average grayscale value determining unit 31, an area, in the image training sample A, that uses the weak classifier 1 as a center and has a same size as a rectangular frame of the weak classifier 1 into multiple areas (for example, 3*3 areas) and calculate an average grayscale value of each of the areas. Table 3 is used as an example.

TABLE 3

| 7 | 8  | 12 |
|---|----|----|
| 8 | 9  | 11 |
| 6 | 20 | 19 |

Numbers in the foregoing table 3 are average grayscale values of various areas and may be specifically obtained by integral image calculation when the average grayscale value determining unit 31 determines the average grayscale value of each area in the foregoing table 3. After the average grayscale value determining unit 31 obtains, by calculation, the average grayscale value of each of the foregoing areas, the setting unit 32 may further select an area from the foregoing areas as a reference area (for example, a central area in table 3, that is, an area of which the average grayscale value is 9) and set a sign bit of each area, except the reference area, in the foregoing areas, where the foregoing sign bit includes a first sign bit (for example, 1) and a second sign bit (for example, −1). After the setting unit 32 sets the sign bit of each of the foregoing areas, the sketch value determining unit 33 may calculate a sketch value corresponding to a threshold of the foregoing weak classifier 1 according to the average grayscale value and the sign bit of each of the foregoing areas. For example, when the preset threshold of a weak classifier is 2, a sketch value, in the image training sample A, of the foregoing weak classifier 1 may be calculated when the threshold of the weak classifier 1 is 2. Specifically, when determining the sketch value of the weak classifier, the sketch value determining unit 33 may first compare the average grayscale value of each area except the reference area with the average grayscale value of the reference area separately by using the comparison subunit 331 and mark a location of each of the foregoing areas by using the first marking subunit 332 or the second marking subunit 333. Specifically, when the sign bit of the foregoing area is the first sign bit, the first marking subunit 332 may mark a location of the area as a first location mark (for example, 1) if a comparison result determined by the foregoing comparison subunit 331 is that a difference between the average grayscale value of the foregoing area and the average grayscale value of the reference area is greater than or equal to the preset threshold (that is, 2) of a weak classifier; otherwise, the location of the area is marked as a second location mark (for example, 0). When the sign bit of the foregoing area is the second sign bit, the second marking subunit 333 may mark the location of the foregoing area as the first location mark if the comparison result determined by the foregoing comparison subunit 331 is that an opposite number of the difference between the average grayscale value of the foregoing area and the average grayscale value of the reference area is greater than or equal to 2; otherwise, the location of the foregoing area is marked as the second location mark. Table 4 is used as an example.

TABLE 4

| 0 | 0 | 1 |
|---|---|---|
| 0 |   | 1 |
| 0 | 1 | 1 |

As shown in table 4, after the first marking subunit 332 or the second marking subunit 333 marks the location of each of the foregoing areas, the sequence value determining subunit 334 may sort a location identifier of each of the foregoing areas according to a preset order (for example, clockwise) to obtain a sequence (00111100); and the foregoing sequence may further be encoded to obtain the sketch value, in the image training sample A, of the weak classifier 1. In specific implementation, as shown in table 4, after the first marking subunit 332 or the second marking subunit 333 marks the location of each of the foregoing areas according to the average grayscale value of each of the foregoing areas, the sequence value determining subunit 334 may obtain an 8-bit binary sequence according to the location mark of each of the foregoing areas and obtain an integer ranging from 0 to 255 by encoding the foregoing binary sequence. The foregoing integer, the location and the size of the rectangular frame of the weak classifier 1, the foregoing integer, the location and the size of the rectangular frame of the weak classifier 1, and a sign bit and a threshold (the foregoing threshold 2) of each area in the rectangular frame of the weak classifier when the sequence is obtained jointly represent features of the weak classifier 1, and a sign bit and a threshold (the foregoing threshold 2) of each area in the rectangular frame of the foregoing weak classifier jointly represent features of the weak classifier 1. In addition, when calculating the sketch value, in the image training sample A, of the weak classifier 1, the processing module 30 may further calculate the sketch value, in the foregoing image training sample A, of the foregoing weak classifier 1 when the preset threshold is another value (for example, each of 0 to 255). The foregoing threshold may be set according to an average grayscale value in each area of the weak classifier and includes any one ranging from a smallest value of a difference between average grayscale values and a largest value of the difference between the average grayscale values. In specific implementation, after calculating the sketch value, in the foregoing image training sample A, of the foregoing weak classifier 1, the processing module 30 may further calculate a sketch value, in another image training sample, of the foregoing weak classifier 1 and may further calculate a sketch value, in each image training sample, of another weak classifier. That is, the processing module 30 may calculate a sketch value, in each image training sample, of each weak classifier according to the foregoing method. The foregoing sketch value may be one of sketch values that are obtained by combining all preset thresholds of weak classifiers with all sign bits of weak classifiers. For example, if there are m weak classifiers, n image training samples (including positive samples and negative samples), two sign bits (including +1 and −1) of the foregoing weak classifiers, 255 preset thresholds of weak classifiers (that is, 255 possibilities), each weak classifier has 255 sketch values corresponding to the first sign bit (+1) and 255 sketch values corresponding to the second sign bit (−1) in each image training sample, 510 sketch values in total; and then it can be learned that each weak classifier has n*510 sketch values in all image training samples. After the processing module 30 determines the sketch values, in all image training samples, of each weak classifier, the selecting module 40 may calculate weighted classification errors of classification performed by each weak classifier on all image training samples according to the sketch values determined by the processing module 30 and the weight of the image training sample; and then the selecting module 40 may select, according to the weighted classification errors of classification performed by each weak classifier on the image training samples and from all weak classifiers (m weak classifiers), a weak classifier that causes a smallest weighted classification error to the image training sample as an optimal weak classifier. In specific implementation, for a specific implementation process of obtaining, by the processing module, the sketch value of the weak classifier by means of processing, reference may be made to step S102 in the embodiment of the method for generating a strong classifier for face detection provided in an embodiment of the present invention. Details are not described herein again.

In some feasible implementation manners, after the processing module 30 obtains, by calculation, the sketch value of each weak classifier of all image training samples, the selecting module 40 may calculate the weighted classification error of each weak classifier according to the foregoing sketch value and the initial weight of the image training sample. In specific implementation, before the selecting module 40 calculates the weighted classification error of classification performed by the weak classifier on the image training sample, the initial weight of the image training sample may be preset by using the setting module 10. After the selecting module 40 determines an optimal weak classifier according to a feature of the weak classifier and the initial weight of the image training sample, the first updating module 60 may update a weight of the image training sample to obtain an updated weight of the image training sample; and the selecting module 40 may determine next one or more optimal weak classifiers according to the sketch value of the weak classifier and the updated weight of the image training sample. For example, after the processing module 30 obtains, by calculation, the sketch value, in the foregoing image training sample A, of the foregoing weak classifier 1 according to the foregoing method, the selecting module 40 may calculate, according to a feature identifier (for example, 1) of the image training sample A, a classification error of classification performed by the weak classifier 1 on the image training sample A (for example, the classification error of classification performed by the weak classifier 1 on the image training sample A may be indicated by the square of a difference between the feature identifier of the image training sample A and the sketch value, in the image training sample A, of the weak classifier 1); and then a sketch value, in another image training sample, of the weak classifier 1 and a classification error of classification performed by the weak classifier 1 on another image training sample are obtained according to the same processing method. After the selecting module 40 determines classification errors of classification performed by the weak classifier 1 on all image training samples, weighted accumulation is performed, according to the initial weight of each image training sample set by the setting module 10, on the classification error of classification performed by the weak classifier 1 on each image training sample, so as to obtain a weighted classification error of classification performed by the weak classifier 1 on total image training samples (n image training samples). The foregoing feature identifier of the image training sample is a predefined input vector (for example, 1) corresponding to a human face feature of the image training sample or a predefined input vector (for example, 0) corresponding to a non-human face feature (feature of another object) of the image training sample.

In some feasible implementation manners, after obtaining, by calculation, weighted classification errors of all the weak classifiers, the selecting module 40 may select a weak classifier that has a smallest weighted classification error from all the weak classifiers as an optimal weak classifier. The foregoing optimal weak classifier may be used to form a strong classifier. In specific implementation, before an optimal weak classifier is selected from multiple weak classifiers, the initial number of weak classifiers, for example, 0, may be set. After the selecting module 40 obtains, by calculation, the weighted classification errors of all the weak classifiers and selects the optimal weak classifier from all the weak classifiers, the second updating module 80 may accumulate the number of selected optimal weak classifiers, so as to ensure that the number of selected optimal weak classifiers meets a preset number. The selecting module 40 may select one or more optimal weak classifiers at each round. The second updating module 80 may update the total number of optimal weak classifiers according to the number of optimal weak classifiers selected by the selecting module 40. For example, when the selecting module 40 determines and obtains that there is only one weak classifier that has the smallest weighted classification error among all the weak classifiers, this weak classifier may be selected as the optimal weak classifier; and the second updating module 80 may increase the total number of optimal weak classifiers by 1. When the selecting module 40 determines and obtains that there are two weak classifiers that have the smallest weighted classification error among all the weak classifiers, that is, the two weak classifiers have a same weighted classification error, and the weighted classification error is a smallest one among all weighted classification errors, both the two weak classifiers that have the smallest weighted classification error may be selected as optimal weak classifiers; and the second updating module 80 may increase the total number of optimal weak classifiers by 2.

In some feasible implementation manners, after the selecting module 40 selects the weak classifier that has the smallest weighted classification error from all the weak classifiers as the optimal weak classifier according to weighted classification errors of classification performed by all the foregoing weak classifiers on the image training samples, the judging module 60 may determine, according to the number of optimal weak classifiers selected by the selecting module 40, whether the number of optimal weak classifier is less than the preset number. Specifically, if the judging module 60 determines that the total number of optimal weak classifiers is less than the preset number, the weight of the image training sample may be updated by using the first updating module; and an optimal weak classifier continues to be selected by the selecting module 40. If the judging module 60 determines and learns that the total number of optimal weak classifiers is not less than the preset number, the generating module 50 may be informed to generate a strong classifier according to all optimal weak classifiers. In specific implementation, when the judging module 60 determines and learns that the total number of optimal weak classifiers is less than the preset number, the first updating module 70 may perform face detection on each of the foregoing image training samples by using the foregoing optimal weak classifier, classify each image training sample according to a detected feature, and then determine, according to a classification result, whether the detected feature corresponds to a feature of the image training sample. If the detected feature matches the feature of the image training sample (that is, the classification result of the image training sample corresponds to the feature of the image training sample), the weight of the image training sample may be reduced; if the detected feature does not match the feature of the image training sample, the weight of the image training sample may be increased. The foregoing detected feature includes a human face feature or a non-human face feature. For example, if it is detected, by using the foregoing optimal weak classifier, that a feature of the image training sample A is the human face feature, the first updating module 70 may classify the image training sample into a category corresponding to the human face feature. If the image training sample A is a positive sample (that is, a sample that includes the human face feature), it can be determined that a classification result of the image training sample A corresponds to the feature of the image training sample A, and then a weight of the image training sample A may be reduced. If it is detected, by using the foregoing image training sample, that the feature of the image training sample A is the non-human face feature, the first updating module 70 may classify the image training sample A into a category corresponding to the non-human face feature. However, the image training sample A is a positive sample; therefore, it can be determined and obtained that the classification result of the image training sample does not correspond to the feature of the image training sample A. In this case, the first updating module 70 may increase the weight of the image training sample A, so as to strengthen training on the image training sample A. Specifically, after the first updating module 70 updates the weight of the image training sample, the selecting module 40 may repeat, according to a new weight of an image sample, the foregoing step of calculating the weighted classification error of the weak classifier, so that a weighted classification error of classification performed by each weak classifier on the foregoing image training sample with the updated weight may be obtained by calculation; and then the weak classifier that has the smallest weighted classification error may be selected from all the weak classifiers as a new optimal weak classifier according to a new weighted classification error. In specific implementation, after the selecting module 40 selects a preset number of optimal weak classifiers according to the foregoing method, a strong classifier, for example, a strong classifier in a first cascade of a face detection classifier, may be generated by using the generating module 50 according to the foregoing preset number of optimal weak classifiers.

In some feasible implementation manners, after the selecting module 40 selects a preset number of optimal weak classifiers in any cascade and uses the preset number of optimal weak classifiers to form a strong classifier in the cascade by using the generating module 50, a user may replace a prestored image training sample; and an optimal weak classifier in another cascade among the number of cascades of the foregoing face detection classifier is acquired again by using the foregoing modules, so as to generate a strong classifier in another cascade. In specific implementation, after the strong classifier for face detection is generated by using the foregoing modules, face detection may be performed on prestored image training samples by using the strong classifier; and the image training samples are classified according to a detected feature of the image training samples to detect whether a classification effect of the strong classifier meets a desired requirement, so as to determine, according to a detection result, whether to replace the prestored image training samples with a batch of new image training samples for training. For example, an image training sample that includes a new human face feature is added; or an image training sample that includes a new non-human face feature is added; or a new image training sample that includes a non-human face feature is used to replace a specified image training sample in the prestored image training samples; or the like. For example, if a human face feature in an image sample is not very clear, which causes a relatively large weighted classification error of classification performed by a weak classifier on the image training sample in a training process, an image sample in which a human face feature is relatively clear is added to the prestored image training samples, so as to strengthen training on the human face feature. In this way, after the prestored image training samples are replaced with a batch of new image training samples, the foregoing process may be cyclically performed again to generate a strong classifier in a new cascade; afterward, the prestored image training samples are updated after each generation of a strong classifier in a cascade to generate a strong classifier in a new cascade, until the number of generated strong classifiers is not less than a number required by a preset number of cascades. After all strong classifiers in the preset number of cascades are generated according to the foregoing method, all the strong classifiers may be combined into a face detection classifier, so as to perform face detection on an image sample by using the foregoing face detection classifier. In specific implementation, for a specific implementation process of calculating, by the selecting module, the weighted classification error of each weak classifier according to a feature of each weak classifier and the weight of the image training sample, selecting the optimal weak classifier from all the weak classifiers, and then generating the strong classifier for face detection by using the generating module 50, reference may be made to steps S103 and S104 in the embodiment of the method for generating a strong classifier for face detection provided in an embodiment of the present invention. Details are not described herein again.

According to an apparatus for generating a strong classifier for face detection described in this embodiment, a size of an image training sample, and a sign bit and a threshold of a weak classifier may be preset; a location and a size of a rectangular frame of the weak classifier may be determined according to the size of the image training sample; when a sketch value of the image training sample is calculated, the sketch value of the image training sample may be calculated according to the preset sign bit and threshold of the weak classifier and with reference to an average grayscale value of each small area in the rectangular frame of the weak classifier; then, a weighted classification error of classification performed by the weak classifier on the image training sample may be calculated according to the sketch value and a weight of the image training sample; an optimal weak classifier is selected from all weak classifiers according to the weighted classification error; a strong classifier is generated according to all selected optimal weak classifiers; and the strong classifier may further be combined into a face detection classifier. When an image training sample is detected by the strong classifier for face detection generated by the apparatus for generating a face detection classifier described in this embodiment, robustness against noise may be improved, accuracy of face detection is increased, and a user experience effect of face detection is enhanced.

A person of ordinary skill in the art may understand that all or a part of the processes of the methods in the embodiments may be implemented by a computer program instructing relevant hardware, e.g. a processor. The program may be stored in a computer readable storage medium. When the program runs, the processes of the methods in the embodiments are performed. The storage medium may include: a magnetic disk, an optimal disc, a read-only memory (Read-Only Memory, ROM), or a random access memory (Random Access Memory, RAM).

What is disclosed above is merely exemplary embodiments of the present invention. However, the protection scope of the present invention is not limited thereto. Therefore, equivalent variations made according to the claims of the present invention shall fall within the scope of the present invention.

What is claimed is:

1. A method for generating a strong classifier for face detection, the method comprising:
   determining, according to a size of a prestored image training sample, a parameter of each of one or more weak classifiers of the image training sample;
   obtaining, according to a preset threshold of each of the one or more weak classifiers and the parameter of each weak classifier, a sketch value of each of the one or more weak classifiers of the image training sample;
   calculating, according to the sketch value of each weak classifier and an initial weight of the image training sample, a weighted classification error of each of the one or more weak classifiers of the image training sample;
   obtaining, according to the weighted classification error of each weak classifier, one or more optimal weak classifiers; and
   generating a strong classifier for face detection according to the one or more optimal weak classifiers.

2. The method according to claim 1, wherein the one or more optimal weak classifiers are weak classifiers that have a weighted classification error smaller than a weighted classification error of the weak classifiers that are not optimal weak classifiers.

3. The method according to claim 1, wherein before obtaining a sketch value of each of the one or more weak classifiers of the image training sample, the method further comprises setting an initial number of optimal weak classifiers; and
   wherein before generating a strong classifier for face detection according to the optimal weak classifiers, the method further comprises performing a sequence of operartions, the sequence including:
   determining a total number of obtained optimal weak classifiers according to a number of optimal weak classifiers obtained according to the weighted classification error of each weak classifier and the initial number of optimal weak classifiers;

determining that the number of obtained optimal weak classifiers is less than a preset number, obtaining an updated weight of the image training sample;

calculating, according to the sketch value of each weak classifier and the updated weight of the image training sample, an updated weighted classification error of each of the one or more weak classifiers of the image training sample;

obtaining, according to the updated weighted classification error of each weak classifier, one or more updated optimal weak classifiers; and updating the total number of obtained optimal weak classifiers according to a number of the one or more updated optimal weak classifiers obtained according to the updated weighted classification error of each weak classifier wherein the sequence is repeated until the total number of obtained optimal weak classifiers is not less than the preset number.

4. The method according to claim 1, wherein the parameter of each weak classifier comprises a location and a size of a rectangular frame of the weak classifier, and wherein obtaining a sketch value of each of the one or more weak classifiers of the image training sample comprises, for each weak classifier of the one or more weak classifiers of the image training sample:

dividing an area, the area having a same size as the rectangular frame of the weak classifier and the area using the location of the rectangular frame of the weak classifier as a center, into at least two subareas,— calculating an average grayscale value of each of the at least two subareas;

selecting a reference area from the at least two subareas, setting, for each of the at least two subareas except the reference area, a sign bit that includes one of a first sign bit or a second sign bit;

obtaining a sketch value of the weak classifier according to the average grayscale values of the at least two subareas except the reference area, the sign bits of the at least two subareas except the reference area, and the preset threshold of the weak classifier.

5. The method according to claim 4, wherein the obtaining a sketch value of the weak classifier comprises:

comparing the average grayscale value of each of the at least two subareas except the reference area with the average grayscale value of the reference area;

marking, for each of the at least two subareas except the reference area having a sign bit that is the first sign bit, a location of the area as a first location mark if a difference between the average grayscale value of the area and the average grayscale value of the reference area is not less than the threshold, and marking the location of the area as a second location mark if the difference between the average grayscale value of the area and the average grayscale value of the reference area is less than the threshold;

marking, for each of the at least two subareas except the reference area having a sign bit that is the second sign bit, the location of the area as the first location mark if an opposite number of the difference between the average grayscale value of the area and the average grayscale value of the reference area is not less than the threshold, and marking the location of the area as the second location mark if the opposite number of the difference between the average grayscale value of the area and the average grayscale value of the reference area is less than the threshold; and sorting location marks of all the areas according to a preset order to obtain a sequence, and obtaining the sketch value of the weak classifier according to the sequence.

6. The method according to claim 1, wherein calculating the weighted classification error of each of the one or more weak classifiers comprises:

calculating, according to the sketch value of the weak classifier and a feature identifier of each image training sample, a classification error of classification performed by the weak classifier on each image training sample; and obtaining a weighted classification error of the weak classifier by performing weighted accumulation, according to an initial weight of each image training sample, on the classification error of classification performed by the weak classifier on each image training sample, wherein the feature identifier of the image training sample is one of a preset input vector corresponding to a human face feature of the image training sample or a preset input vector corresponding to a non-human face feature of the image training sample.

7. The method according to claim 3, wherein obtaining an updated weight of the image training sample comprises:

performing face detection on the image training sample according to the one or more optimal weak classifiers;

classifying the image training sample according to a detected feature, wherein the feature comprises a human face feature or a non-human face feature;

if a classification result of the image training sample matches to a feature of the image training sample, reducing the weight of the image training sample to obtain the updated weight of the image training sample; and if the classification result of the image training sample does not match to a feature of the image training sample, increasing the weight of the image training sample to obtain the updated weight of the image training sample.

8. An apparatus for generating a strong classifier for face detection, the apparatus having a processor comprising:

a determining module, configured to determine, according to a size of a prestored image training sample, a parameter of each of one or more weak classifiers of the image training sample;

a processing module, configured to obtain, according to a preset threshold of each of the one or more weak classifiers and the parameter of each weak classifier, a sketch value of each of the one or more weak classifiers of the image training sample;

a selecting module, configured to calculate, according to the sketch value of each weak classifier obtained by the processing module and an initial weight of the image training sample, a weighted classification error of each of the one or more weak classifiers of the image training sample; and to obtain, according to the weighted classification error of each of tweak classifier, one or more optimal weak classifiers at least one optimal weak classifier according to the weighted classification error; and a generating module, configured to generate a strong classifier for face detection according to the one or more optimal weak classifiers selected by the selecting module.

9. The apparatus according to claim 8, wherein the one or more optimal weak classifiers are weak classifiers that have a weighted classification error smaller than a weighted classification error of the weak classifiers that are not optimal weak classifiers.

10. The apparatus according to claim 8, wherein the processor further comprises:
 a setting module, configured to set an initial number of optimal weak classifiers;
 a judging module, configured to determine whether a number of optimal weak classifiers obtained by the selection module is less than a preset number;
 a second updating module, configured to determine the total number of optimal weak classifiers according to the number of optimal weak classifiers that are obtained by the selecting module and the initial number of optimal weak classifiers that is set by the setting module; and
 a first updating module, configured to, when a determining result of the judging module is that the total number of obtained optimal weak classifiers is less than the preset number, update a weight of the image training sample to obtain an updated weight of the image training sample,
 wherein the selecting module is configured to calculate a weighted classification error of each of the weak classifiers according to the sketch value obtained by the processing module and the updated weight of the image training sample to obtain an updated weighted classification error of each of the one or more weak classifiers of the image training sample and to obtain, according to the updated weighted classification error of each weak classifier, one or more updated optimal weak classifiers;
 wherein the second updating module is configured to update the total number of obtained optimal weak classifiers according to the number of optimal weak classifiers that are obtained by the selecting module; and
 the generating module is configured to, when the determining result of the judging module is that the total number of obtained optimal weak classifiers is not less than the preset number, generate the strong classifier for face detection according to the optimal weak classifiers selected by the selecting module.

11. The apparatus according to claim 8, wherein the parameter of each weak classifier determined by the determining module comprises a location and a size of a rectangular frame of the weak classifier, and the processing module comprises:
 an average grayscale value determining unit, configured to divide an area, the area having a same size as the rectangular frame of the weak classifier and the area using a location of the rectangular frame of the weak classifier as a center, into at least two subareas, and to calculate an average grayscale value of each of the at least two subareas;
 a setting unit, configured to select a reference area from the at least two subareas, and to set, for each of the at least two subareas except the reference area, a sign bit that includes one of a first sign bit or a second sign bit; and
 a sketch value determining unit, configured to obtain a sketch value of the weak classifier according to the average grayscale values of the at least two subareas except the reference area, the sign bits of the at least two subareas except the reference area, and the preset threshold of the weak classifier.

12. The apparatus according to claim 11, wherein the sketch value determining unit comprises:
 a comparison subunit, configured to compare the average grayscale value of each of the at least two subareas except the reference area with the average grayscale value of the reference area;
 a first marking subunit, configured to:
  for each of the at least two subareas except the reference area, mark a location of the area with a first location mark if a comparison result of the comparison subunit is that a difference between the average grayscale value of the area and the average grayscale value of the reference area is not less than the preset threshold of the weak classifier and if the sign bit of the subarea is the first sign bit, and
  for each of the at least two subareas except the reference area, mark the location of the area as a second location mark if the comparison result of the comparison subunit is that the difference between the average grayscale value of the area and the average grayscale value of the reference area is less than the preset threshold of a weak classifier and if the sign bit of the subarea is the first sign bit;
 a second marking subunit, configured to,
  for each of the at least two subareas except the reference area, mark the location of the area as the first location mark if the comparison result of the comparison subunit is that an opposite number of the difference between the average grayscale value of the area and the average grayscale value of the reference area is not less than the preset threshold of a weak classifier and when the sign bit of the area is the second sign bit, and
  for each of the at least two subareas except the reference area, mark the location of the area as the second location mark if the comparison result of the comparison subunit is that the opposite number of the difference between the average grayscale value of the area and the average grayscale value of the reference area is less than the preset threshold of a weak classifier and when the sign bit of the area is the second sign bit; and
 a sequence value determining subunit, configured to sort location marks of all the areas according to a preset order to obtain a sequence and to obtain the sketch value of the weak classifier according to the sequence.

13. The apparatus according to claim 8, wherein the selecting module is further configured to:
 calculate, according to the sketch value of the weak classifier and a feature identifier of each image training sample, a classification error of classification performed by the weak classifier on each image training sample; and
 obtain a weighted classification error of the weak classifier by performing weighted accumulation, according to an initial weight of each image training sample, on the classification error of classification performed by the weak classifier on each image training sample
 wherein the feature identifier of the image training sample is one of a preset input vector corresponding to a human face feature of the image training sample or a preset input vector corresponding to a non-human face feature of the image training sample.

14. The apparatus according to claim 10, wherein the first updating module is configured to:

perform face detection on the image training sample according to the one or more optimal weak classifiers and classify the image training sample according to a detected feature, wherein the feature includes one of a human face feature or a non-human face feature;

if a classification result of the image training sample corresponds to a feature of the image training sample, reduce the weight of the image training sample to obtain the updated weight of the image training sample; and if the classification result of the image training sample does not correspond to the feature of the image training sample, increase the weight of the image training sample to obtain the updated weight of the image training sample.

* * * * *